US009940019B2

(12) United States Patent
Li-On et al.

(10) Patent No.: US 9,940,019 B2
(45) Date of Patent: Apr. 10, 2018

(54) ONLINE MIGRATION OF A LOGICAL VOLUME BETWEEN STORAGE SYSTEMS (71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Eyal Perek, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/916,120

(22) Filed: Jun. 12, 2013

(65) Prior Publication Data

US 2014/0372639 A1   Dec. 18, 2014

(51) Int. Cl.
G06F 3/06 (2006.01)

(52) U.S. Cl.
CPC ........... *G06F 3/0604* (2013.01); *G06F 3/061* (2013.01); *G06F 3/067* (2013.01); *G06F 3/0647* (2013.01); *G06F 3/0665* (2013.01)

(58) Field of Classification Search
None
See application file for complete search history.

(56) References Cited

U.S. PATENT DOCUMENTS

| 6,209,023 | B1 | 3/2001 | Dimitroff et al. |
| 6,356,977 | B2 | 3/2002 | Ofek et al. |
| 6,400,730 | B1 | 6/2002 | Latif et al. |
| 6,405,294 | B1 | 6/2002 | Hayter |
| 6,557,048 | B1 | 4/2003 | Keller et al. |
| 6,718,402 | B1 | 4/2004 | Arroyo |

(Continued)

FOREIGN PATENT DOCUMENTS

EP   2557494 A1 * 2/2013 ........... G06F 3/0613

OTHER PUBLICATIONS

Bigang et al., "Design and Implementation of a Storage Virtualization System Based on SCSI Target Simulator in SAN," Tsinghua Science and Technology, v. 10, n. 1, p. 122-127.

(Continued)

*Primary Examiner* — Idriss N Alrobaye
*Assistant Examiner* — Dayton Lewis-Taylor
(74) *Attorney, Agent, or Firm* — Griffiths & Seaton PLLC (57) ABSTRACT

Methods, apparatus and computer program products implement embodiments of the present invention that include configuring, by a source storage system, a logical volume to comprise source regions of the source storage system that have a mapping between a host computer and the source storage system, the source regions storing source data. The source data is copied from the source regions to target data in target regions of a target storage system, the target regions being in a one-to-one correspondence with the source regions, and the volume is reconfigured so that the target regions have the mapping between the host computer and the source storage system. In some embodiments, the mapping between the host computer and the source storage system comprises a first mapping, and upon reconfiguring the volume, a second mapping can be added between the host computer and the target storage system, and the first mapping can be deleted.

11 Claims, 4 Drawing Sheets

(56) References Cited

U.S. PATENT DOCUMENTS

| | | |
|---|---|---|
| 6,915,354 B1 | 7/2005 | Ozdemir et al. |
| 6,922,761 B2 | 7/2005 | O'Connell et al. |
| 6,934,799 B2 | 8/2005 | Acharya et al. |
| 6,976,103 B1 | 12/2005 | Watanabe et al. |
| 7,103,712 B2 | 9/2006 | Mizuno |
| 7,173,929 B1 | 2/2007 | Testardi |
| 7,191,304 B1* | 3/2007 | Cameron ............ G06F 11/1456 707/999.202 |
| 7,209,981 B1 | 4/2007 | Wade et al. |
| 7,321,925 B2 | 1/2008 | Trethewey |
| 7,340,639 B1 | 3/2008 | Lee et al. |
| 7,409,442 B2 | 8/2008 | Basham et al. |
| 7,577,169 B1 | 8/2009 | Dinh et al. |
| 7,594,024 B2 | 9/2009 | Shah et al. |
| 7,610,467 B2 | 10/2009 | Mimatsu et al. |
| 7,634,588 B2 | 12/2009 | Okada et al. |
| 7,640,408 B1 | 12/2009 | Halligan et al. |
| 7,668,981 B1 | 2/2010 | Nagineni et al. |
| 7,707,151 B1 | 4/2010 | Blumenau et al. |
| 7,757,055 B2 | 7/2010 | Tsukada et al. |
| 7,778,157 B1 | 8/2010 | Tawri et al. |
| 7,904,681 B1 | 3/2011 | Bappe et al. |
| 7,937,617 B1 | 5/2011 | Nagineni et al. |
| 8,028,110 B1 | 9/2011 | Wigmore |
| 8,060,710 B1 | 11/2011 | Don et al. |
| 8,086,896 B2 | 12/2011 | Allen et al. |
| 8,122,225 B2 | 2/2012 | Recio et al. |
| 8,160,070 B2 | 4/2012 | Dai et al. |
| 8,166,163 B2 | 4/2012 | Ma et al. |
| 8,230,187 B1 | 7/2012 | Krinke, II et al. |
| 8,254,388 B2 | 8/2012 | Kikuchi et al. |
| 8,270,420 B2 | 9/2012 | Wang et al. |
| 8,301,812 B1* | 10/2012 | Riordan et al. ................ 710/74 |
| 8,359,379 B1 | 1/2013 | Sen |
| 8,370,588 B2 | 2/2013 | Nakajima et al. |
| 8,380,852 B2 | 2/2013 | Allen et al. |
| 8,386,610 B2 | 2/2013 | Yahalom et al. |
| 8,417,895 B1 | 4/2013 | De La Iglesia |
| 8,429,446 B2 | 4/2013 | Hara et al. |
| 8,601,220 B1* | 12/2013 | Corbin et al. ................ 711/150 |
| 8,713,356 B1 | 4/2014 | Chan et al. |
| 8,819,317 B1 | 8/2014 | Li-On et al. |
| 8,904,050 B1 | 12/2014 | Raizen et al. |
| 2002/0071386 A1 | 6/2002 | Gronke |
| 2002/0073297 A1 | 6/2002 | Mizuno et al. |
| 2002/0174315 A1* | 11/2002 | Yamamoto ............ G06F 3/0613 711/170 |
| 2002/0193146 A1 | 12/2002 | Wallace et al. |
| 2002/0194407 A1 | 12/2002 | Kim |
| 2003/0067890 A1 | 4/2003 | Goel et al. |
| 2003/0212785 A1 | 11/2003 | Jibbe |
| 2005/0071577 A1 | 3/2005 | Dias et al. |
| 2005/0157730 A1 | 7/2005 | Grant et al. |
| 2005/0210144 A1 | 9/2005 | Kumagai et al. |
| 2006/0291392 A1 | 12/2006 | Alicherry et al. |
| 2007/0168396 A1 | 7/2007 | Adams et al. |
| 2008/0270564 A1 | 10/2008 | Rangegowda et al. |
| 2009/0037638 A1* | 2/2009 | Izuta et al. ................ 710/316 |
| 2009/0094428 A1* | 4/2009 | Nagata ............... G06F 11/2074 711/162 |
| 2009/0213736 A1 | 8/2009 | Liu et al. |
| 2009/0292834 A1 | 11/2009 | Neemidge et al. |
| 2010/0011114 A1 | 1/2010 | Thomas et al. |
| 2010/0070722 A1* | 3/2010 | Otani et al. ................ 710/74 |
| 2010/0161843 A1 | 6/2010 | Spry |
| 2010/0185794 A1 | 7/2010 | Belyakov et al. |
| 2010/0262772 A1 | 10/2010 | Mazina |
| 2011/0004707 A1 | 1/2011 | Spry et al. |
| 2011/0179414 A1 | 7/2011 | Goggin et al. |
| 2011/0239014 A1 | 9/2011 | Karnowski |
| 2012/0137098 A1 | 5/2012 | Wang et al. |
| 2012/0188949 A1 | 7/2012 | Salkintzis et al. |
| 2012/0221790 A1 | 8/2012 | Nunez et al. |
| 2012/0278280 A1 | 11/2012 | Broido et al. |
| 2012/0278572 A1 | 11/2012 | Broido et al. |
| 2013/0007364 A1 | 1/2013 | Xiong et al. |
| 2013/0046949 A1 | 2/2013 | Colgrove et al. |
| 2013/0067163 A1 | 3/2013 | Velayudhan et al. |
| 2013/0339647 A1* | 12/2013 | Jindo et al. ................ 711/165 |

OTHER PUBLICATIONS

Bigang et al., "Design and Implementation of a Storage Virtualization System Based on SCSI Target Simulator in SAN," Tsinghua Science and Technology, v.10, n.1, p. 122-127.

* cited by examiner

ONLINE MIGRATION OF A LOGICAL VOLUME BETWEEN STORAGE SYSTEMS

CROSS-REFERENCE TO RELATED APPLICATIONS

This application is related to U.S. Patent Applications titled "Processing Input/Output Requests Using Proxy and Owner Storage Systems", "Impersonating SCSI Ports Via an Intermediate Proxy", "Safely Mapping and Unmapping of Host SCSI Volumes", "Unit Attention Processing in Proxy and Owner Storage Systems" and "Load Balancing Input/Output Requests Between Two Computers" filed on even date with the present application, and which are incorporated herein by reference.

FIELD OF THE INVENTION

The present invention relates generally to storage systems, and specifically to migrating a logical volume from a source storage system to a target storage system.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) and are exposed through a unique identifier such as a logical unit number (LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY

There is provided, in accordance with an embodiment of the present invention a method, including configuring, by a source storage system, a logical volume to comprise source regions of the source storage system that have a mapping between a host computer and the source storage system, the source regions storing source data, copying the source data from the source regions to target data in target regions of a target storage system, the target regions being in a one-to-one correspondence with the source regions, and reconfiguring the logical volume so that the target regions have the mapping between the host computer and the source storage system.

There is also provided, in accordance with an embodiment of the present invention a storage facility, including a storage area network (SAN), a host computer configured on the SAN, a target storage system having target regions and configured on the SAN, and a source storage system having source regions, and configured on the SAN, and arranged to configure a logical volume to comprise the source regions having a mapping between the host computer and the source storage system, the source regions storing source data, to copy the source data from the source regions to target data in the target regions, the target regions being in a one-to-one correspondence with the source regions, and to reconfigure the logical volume so that the target regions have the mapping between the host computer and the source storage system.

There is further provided, in accordance with an embodiment of the present invention a computer program product, the computer program product including a non-transitory computer readable storage medium having computer readable program code embodied therewith, the computer readable program code including computer readable program code configured to configure a logical volume to comprise source regions of a source storage system having a mapping between a host computer and the source storage system, the source regions storing source data, computer readable program code arranged to copy the source data from the source regions to target data in target regions of a target storage system, the target regions being in a one-to-one correspondence with the source regions, and computer readable program code arranged to reconfigure the logical volume so that the target regions have the mapping between the host computer and the source storage system.

BRIEF DESCRIPTION OF THE DRAWINGS

The disclosure is herein described, by way of example only, with reference to the accompanying drawings, wherein.

DETAILED DESCRIPTION OF EMBODIMENTS

There may be instances when a source storage system having a high storage utilization is currently storing a logical volume, and a storage administrator wants to migrate the logical volume from the source storage system to a target storage system in order to balance the storage utilization across the storage systems. Embodiments of the present invention provide methods and mechanisms for seamlessly migrating a logical volume from a source storage system to a target storage system. In embodiments described herein, the source and the target storage systems are configured to communicate over a multipath Small Computer System Interface (SCSI) based storage area network (SAN).

As described hereinbelow, the logical volume can be initially mapped between a host computer and the source storage system. After copying the logical volume's data from the source storage system to the target storage system, the logical volume's data can be deleted from the source storage system. In embodiments of the present invention, the mapping can be maintained between the host computer and the source storage system, even though the logical volume's data is now stored on the target storage system.

By maintaining the mapping, embodiments of the present invention enable the logical volume to be migrated from the source storage system to the target storage system with little or no downtime for the host computer. In other words, the host computer can continue to convey input/output (I/O) requests for the logical volume, during and subsequent to the volume migration embodiments described herein.

In some embodiments, the source storage system can be arranged as a proxy storage system that is configured to receive, from the host computer, input/output (I/O) requests for the logical volume having data stored on the target storage system (also known as an owner storage system). I/O requests for a given logical volume having data stored on the target storage system and having a mapping between the host computer and the source storage system are also referred to herein as proxy I/O requests. Processing proxy I/O requests is described in more detail in U.S. Patent Application "Processing Input/Output Requests Using Proxy and Owner Storage Systems", referenced above.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Figure 1:
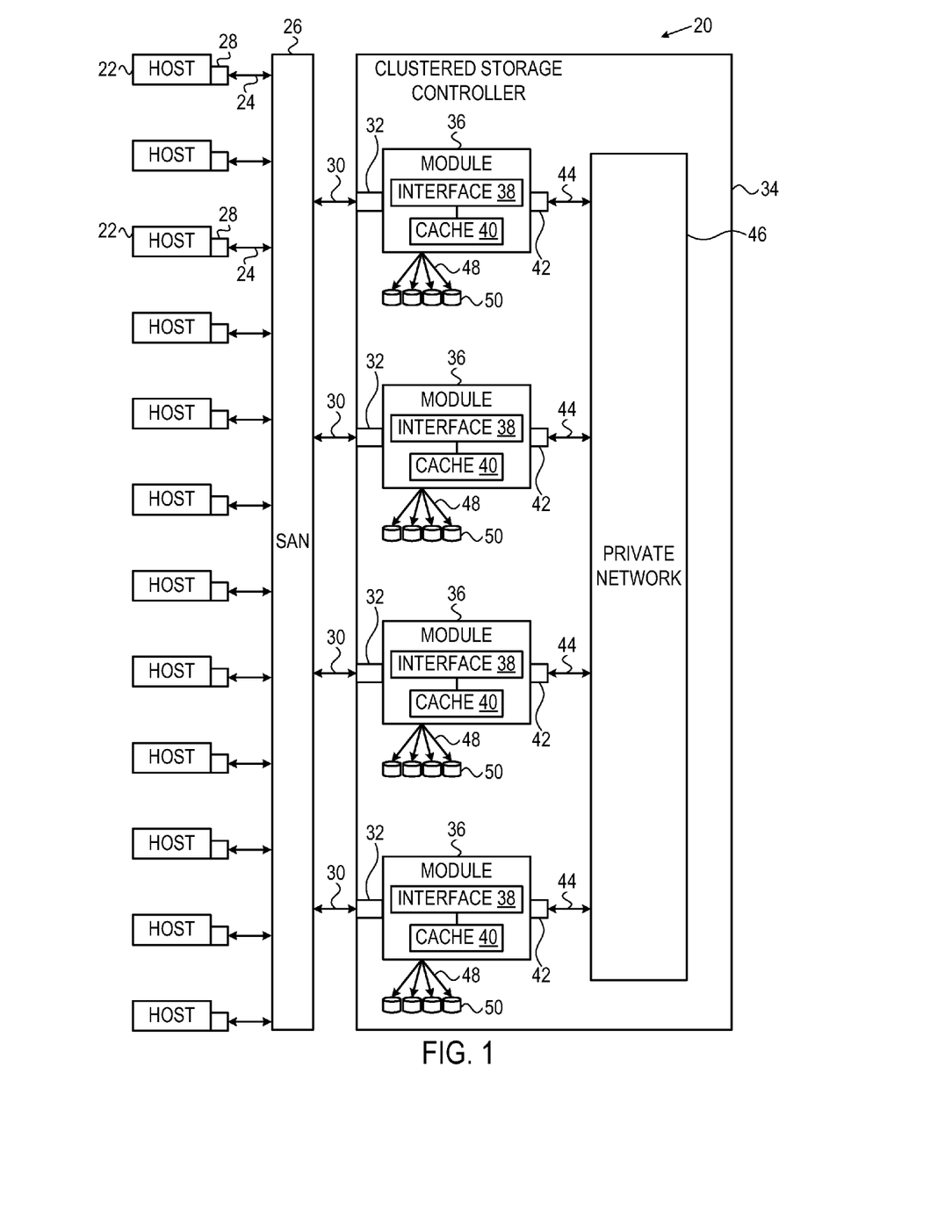
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
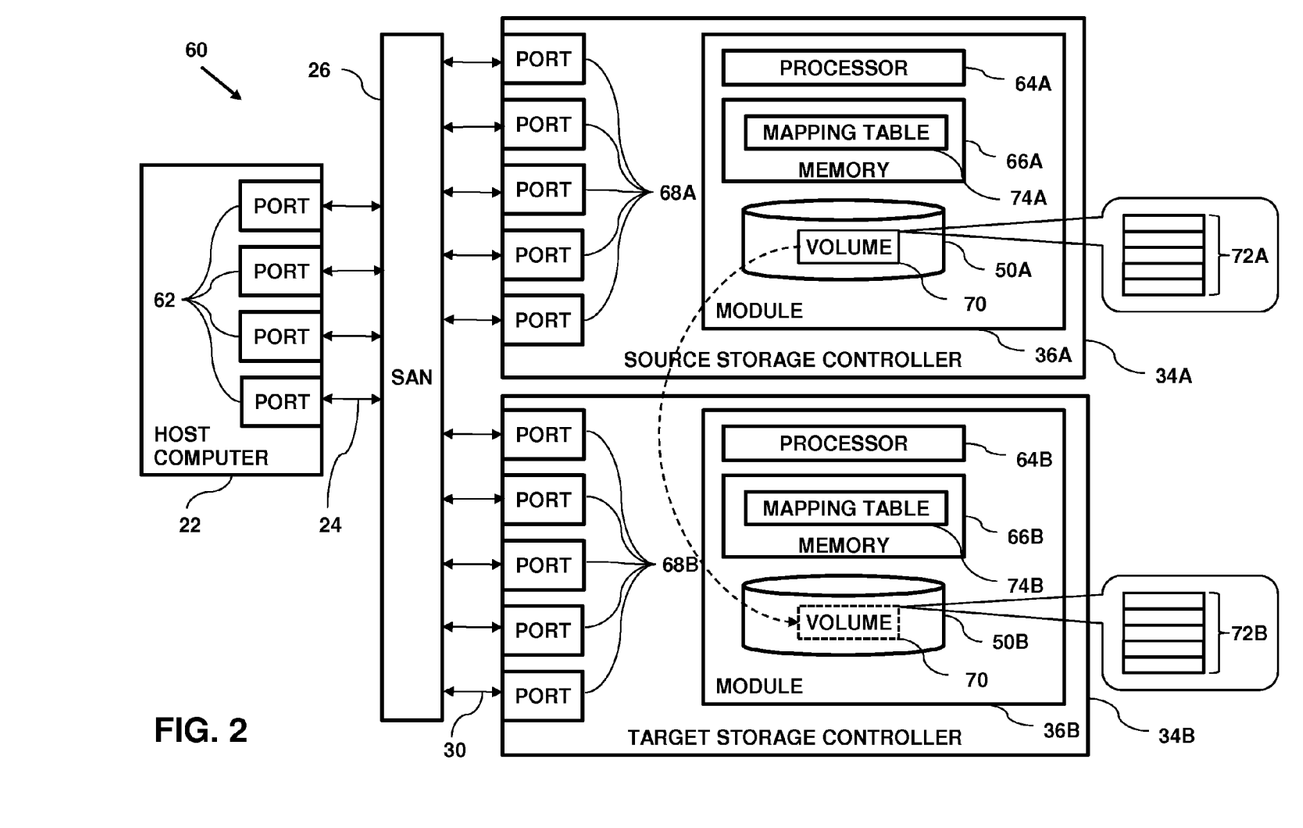
FIG. 2 is a block diagram of a first example of a storage facility configured to migrate a logical volume from a source storage controller to a target storage controller, in accordance with an embodiment of the present invention.

FIG. 2 is a block diagram of a first example of a storage facility 60 configured to seamlessly migrate a logical volume 70, in accordance with an embodiment of the present invention. In the description herein, storage controllers 34 and their respective components may be differentiated by appending a letter to the identifying numeral, so that facility 60 comprises host computer 22 and storage controllers 34A and 34B that are configured to communicate with each other via SAN 26. In embodiments herein, storage controller 34A may also be referred to as source storage controller 34A or proxy storage controller 34A, and storage controller 34B may also be referred to as target storage controller 34B or owner storage controller 34B.

Host computer 22 communicates with SAN 26 via ports 62. Module 36 comprises a processor 64 and a memory 66, and communicates with SAN 26 via ports 68. In some embodiments ports 62 and 68 may comprise SCSI ports, and the SCSI ports may be configured within module 36. In embodiments herein, ports 68A may also be referred to as proxy ports and ports 68B may also be referred to as owner ports.

In the configuration shown in FIG. 2, host computer 22, source storage controller 34A and target storage controller 34B can communicate with each other over multiple paths, wherein each of the paths can be defined as follows:

Host computer 22 and source storage controller 34A can communicate over a given path on SAN 26 between a given port 62 and a given port 68A.

Host computer 22 and source storage controller 34B can communicate over a given path on SAN 26 between a given port 62 and a given port 68B.

Source storage controller 34A and target storage controller 34B can communicate over a given path on SAN 26 between a given port 68A and a given port 68B.

While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, logical volume 70 may be stored across multiple storage devices 50 in a given storage controller 34.

Logical volume 70 comprises data stored in multiple regions 72. Each region (also known as a partition or a block) comprises a sequence of bytes on storage device 50 that have a specific length, e.g., one megabyte. In operation, volume 70 can be mapped between host computer 22 and storage controller 34, and details of the mapping can be stored in a mapping table 74A.

Figure 3:
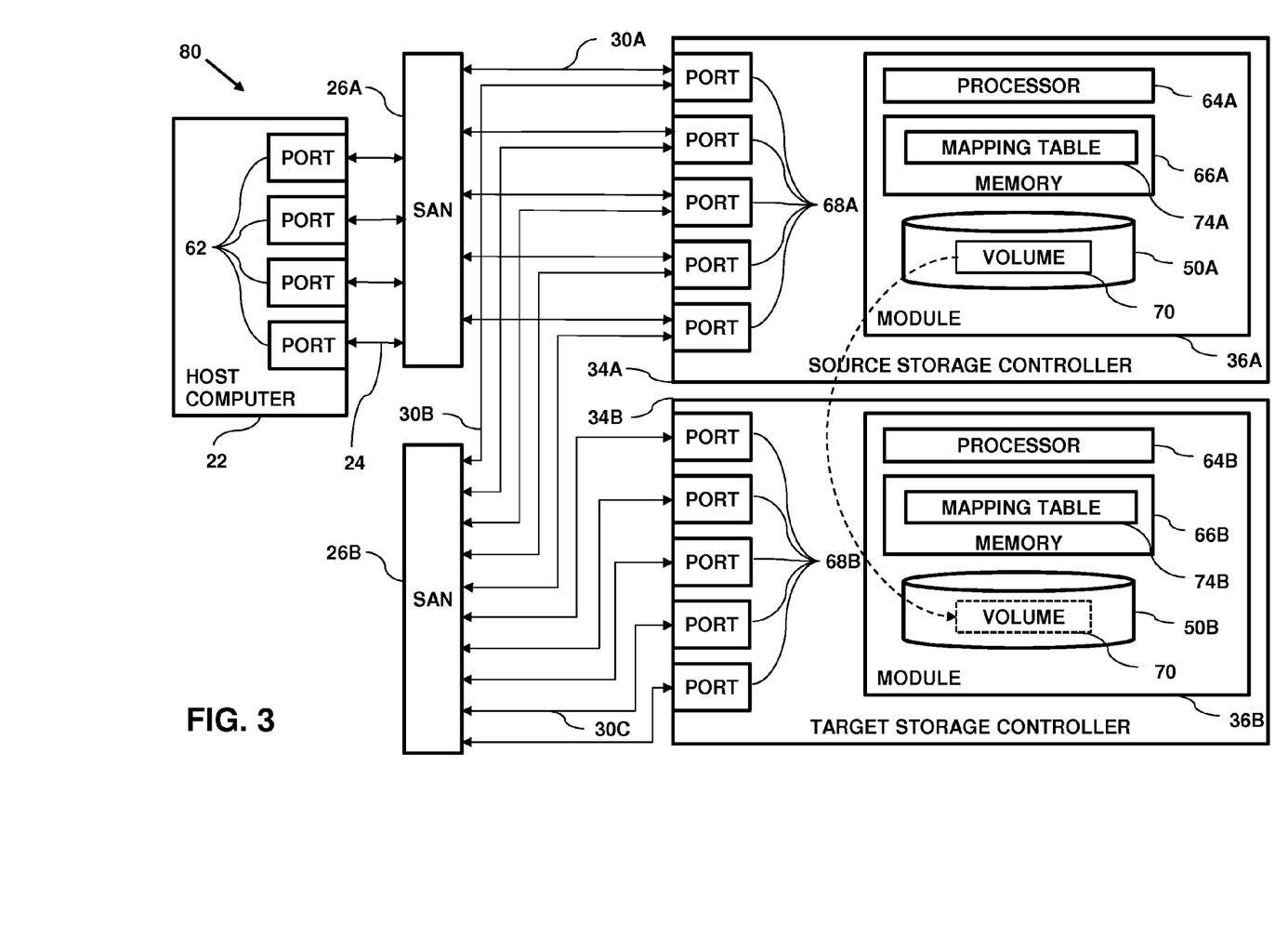
FIG. 3 is a block diagram of a second example of a storage facility configured to migrate the logical volume from the source storage controller to the target storage controller, in accordance with an embodiment of the present invention.

FIG. 3 is a block diagram of a second example of a storage facility 80 configured to seamlessly migrate logical volume 70 from source storage controller 34A to target storage controller 34B, in accordance with an embodiment of the present invention. In the configuration shown in FIG. 3, storage facility 80 comprises separate SANs 26A and 26B, wherein host computer 22 is coupled to SAN 26A via data connections 24, source storage controller is coupled to SAN 26A via data connections 30A, source storage controller 34A is also coupled to SAN 26B via data connections 30B, and storage controller 34B is coupled to SAN 26B via data connections 36C.

In the configuration shown in FIG. 3, host computer 22 can communicate with storage controller 34A, and storage controller 34A can communicate with storage controller 34B over multiple paths, wherein each of the paths can be defined as follows:

Host computer 22 and source storage controller 34A can communicate over a given path on SAN 26A between a given port 62 and a given port 68A.

Source storage controller 34A and proxy target controller 34B can communicate over a given path on SAN 26B between a given port 68A and a given port 68B.

In the configuration shown in FIG. 3, host computer 22 cannot communicate directly with storage controller 34B, since they are configured on different SANs 26.

Processor 64 typically comprises a general-purpose central processing unit (CPU), which is programmed in software to carry out the functions described herein. The software may be downloaded module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Volume Migration

Figure 4:
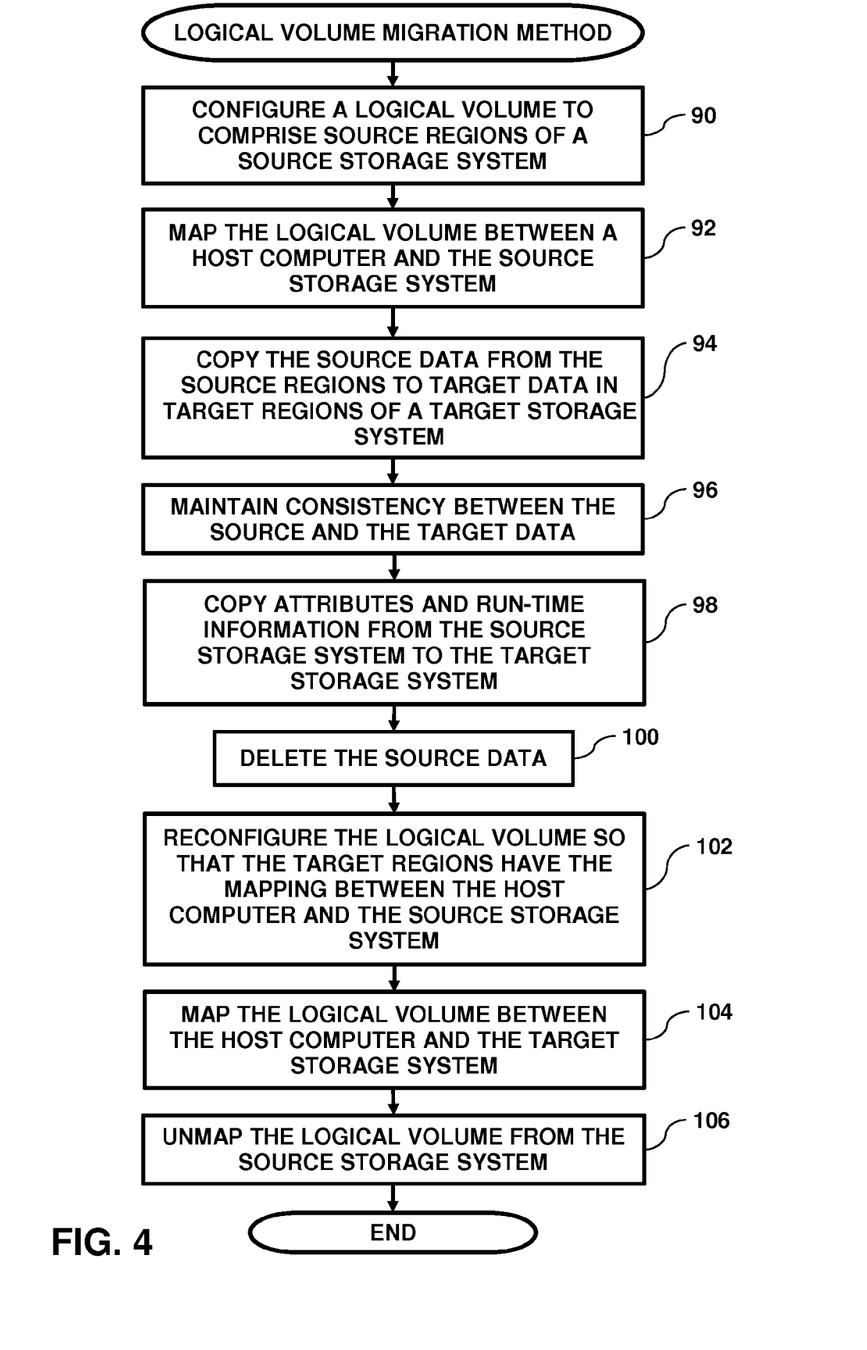
FIG. 4 is a flow diagram that schematically illustrates a method of migrating the logical volume from the source storage controller to the target storage controller, in accordance with an embodiment of the present invention.

FIG. 4 is a flow diagram that schematically illustrates a method of migrating volume 70 from source storage controller 34A to target storage controller 34B, in accordance with an embodiment of the present invention. In a configuration step 90, processor 64A configures logical volume 70 as source regions 72A storing source data, and in a first mapping step 92, processor 64A maps logical volume 70 between host computer 22 and the source storage controller. To map logical volume 70 between host computer 22 and source storage controller 34A, processor 64A can add an entry to mapping table 74 indicating a mapping between the host computer and the source storage controller for logical volume 70.

In a first copy step 94, processor 64A copies the source data from source regions 72A to target regions 72B, wherein the source regions are in a one-to-one correspondence with the target regions. In embodiments described herein, upon completing step 94, target regions 72B store target data that is identical to the source data stored in the corresponding source regions.

In a synchronization step 96, processor 64 maintains consistency between the source and the target data. For example, subsequent to copying the source data from one of the source regions to the corresponding target region 72B, processor 64A may receive a request from host computer 22 to store an update to the one of the source regions. In response to the request, processor 64B stores the update to the one of the source regions. Since processor 64A has already copied the source data in the one of the regions to the corresponding target region, processor 64A also stores the update to the corresponding target region, thereby synchronizing the source data with the target data.

In a second copy step 98, processor 64A copies attributes and run-time information for logical volume 70 from source storage controller 34A to target storage controller 34B. Examples of the attributes include, but not limited to a serial number and a read-only status. Examples of run-time information include, but are not limited to, a reservation and login information.

In a delete step 100, processor 64A deletes the source data from source regions 72A, and in a reconfiguration step 102, processor 64A reconfigures logical volume so that target regions 72B have (i.e., maintain) the mapping between host computer 22 and source storage controller 34A. In some embodiments, processor 64A can perform steps 98, 100 and 102 as a single atomic step. In embodiments of the present invention, host computer 22 can still convey I/O requests (i.e., proxy I/O requests) to source storage controller 34A for volume 70, and source storage controller 34A can be configured to process proxy I/O requests for the logical volume, as described in U.S. Patent Application "Processing Input/Output Requests Using Proxy and Owner Storage Systems", referenced above.

In embodiments where host computer 22, source controller 34A and target storage controller 34B are all configured on a single SAN 26 (as shown in FIG. 2), in a second mapping step 104, processor 64A can map logical volume 70 between host computer 22 and target storage controller 34B. To map logical volume 70 between host computer 22 and target storage controller 34A, processor 64A adds an additional entry to mapping table 74 indicating the mapping between the host computer and the target storage controller for logical volume 70.

Upon mapping logical volume 70 between host computer 22 and target storage controller 34B, processor 64A can, in an unmapping step 106, unmap logical volume 70 from source storage controller 34A, and the method ends. To unmap logical volume 70 from source storage controller 34A, processor 64A can delete the entry in mapping table 74 that indicates the mapping between host computer 22 and source storage controller 34A for volume 70. Upon completion of step 106, host computer 22 can convey I/O requests for logical volume 70 directly to target storage controller 34B.

In some embodiments, the mapping between host computer 22 and source storage controller 34A comprises a first mapping, and the mapping between host computer 22 and target storage controller 34B comprises a second mapping, and unmapping the logical volume from source storage controller 34A comprises deleting the first mapping.

While unmapping logical volume 70 from source storage controller 34A, the source storage controller may have I/O requests pending for logical volume 70. A method to ensure that the pending I/O requests do not fail is described in detail in U.S. patent application "Safe Mapping and Unmapping of Host SCSI Volumes", referenced above.

In embodiments described in the flow diagram, processor 64A adds an additional entry to mapping table 74A when mapping logical volume 70 between host computer 22 and target storage controller 34B, and removes an initial entry from the mapping table when unmapping the logical volume from source storage controller 34A. Upon initiating the mapping and the unmapping operations, a systems administrator can convey a command to all the host computers configured on SAN 26 to rescan mapping tables 74.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring, by a source storage system, a logical volume to comprise source regions of the source storage system that have a mapping between a host computer and the source storage system, the source regions being physical storage blocks within the logical volume of the source storage system storing source data; wherein the logical volume is stored across multiple storage devices in a respective storage controller;
at a first time, copying the source data from the source regions to target data in target regions of a target storage system, the target regions comprising physical blocks within a logical volume of the target storage system and being in a one-to-one correspondence with the source regions; wherein the source regions and the target regions each comprise a partition having a sequence of bytes of a specific length of 1 Megabyte (MB), the sequence of bytes corresponding to a beginning block and ending block of the source data within the logical volume copied from the source regions to the target regions such that only the sequence of bytes comprising the partition of the specific length are copied;
reconfiguring the logical volume so that the target regions have the mapping between the host computer and the source storage system, such that input/output (I/O) requests are proxied through the source storage system to the target storage system;
receiving, by the source storage system, a request to store an update to the one of the source regions, storing the update to the one of the source regions, and storing the update to the proxied corresponding target region; and
at a second time, copying attributes and run-time information for the logical volume from the source storage system to the target storage system, and deleting the source data from the source storage system while maintaining the mapping between the host computer and the source storage system, wherein the attributes comprise a serial number and a read-only status, and wherein the run-time information comprises a reservation and login information.

2. The method according to claim 1, wherein the host computer, the source storage system and the target storage system are configured on a storage area network (SAN).

3. The method according to claim 2, wherein the mapping between the host computer and the source storage system comprises a first mapping, and comprising upon reconfiguring the logical volume, adding, for the logical volume, a second mapping between the host computer and the target storage system, and deleting the first mapping.

4. The method according to claim 1, wherein the host computer and the source storage system are configured on a first storage area network (SAN) and the source storage system and the target storage system are configured on a second SAN.

5. A storage facility, comprising:
a storage area network (SAN);
a host computer configured on the SAN;
a target storage system having target regions and configured on the SAN; and
a source storage system having source regions, and configured on the SAN, and arranged:
to configure a logical volume to comprise the source regions having a mapping between the host computer and the source storage system, the source regions being physical storage blocks within the logical volume of the source storage system storing source data; wherein the logical volume is stored across multiple storage devices in a respective storage controller;
to, at a first time, copy the source data from the source regions to target data in the target regions, the target regions comprising physical blocks within a logical volume of the target storage system and being in a one-to-one correspondence with the source regions; wherein the source regions and the target regions each comprise a partition having a sequence of bytes of a specific length of 1 Megabyte (MB), the sequence of bytes corresponding to a beginning block and ending block of the source data within the logical volume copied from the source regions to the target regions such that only the sequence of bytes comprising the partition of the specific length are copied;

to reconfigure the logical volume so that the target regions have the mapping between the host computer and the source storage system, such that input/output (I/O) requests are proxied through the source storage system to the target storage system;

to receive a request to store an update to the one of the source regions, to store the update to the one of the source regions, and to store the update to the proxied corresponding target region; and to, at a second time, copy attributes and run-time information for the logical volume from the source storage system to the target storage system, and to delete the source data from the source storage system while maintaining the mapping between the host computer and the source storage system, wherein the attributes comprise a serial number and a read-only status, and wherein the run-time information comprises a reservation and login information.

6. The storage facility according to claim 5, wherein the mapping between the host computer and the source storage system comprises a first mapping, and wherein upon reconfiguring the logical volume, the source storage system is configured to add, for the logical volume, a second mapping between the host computer and the target storage system, and to delete the first mapping.

7. The storage facility according to claim 1, wherein the SAN comprises a first SAN, and comprising a second SAN, wherein the host computer and the source storage system are configured on the first SAN, and the source storage system and the target storage system are configured on the second SAN.

8. A computer program product, the computer program product comprising:

a non-transitory computer readable storage medium having computer readable program code embodied therewith, the computer readable program code comprising:

computer readable program code arranged to configure a logical volume to comprise source regions of a source storage system having a mapping between a host computer and the source storage system, the source regions being physical storage blocks within the logical volume of the source storage system storing source data; wherein the logical volume is stored across multiple storage devices in a respective storage controller;

computer readable program code arranged to, at a first time, copy the source data from the source regions to target data in target regions of a target storage system, the target regions comprising physical blocks within a logical volume of the target storage system and being in a one-to-one correspondence with the source regions; wherein the source regions and the target regions each comprise a partition having a sequence of bytes of a specific length of 1 Megabyte (MB), the sequence of bytes corresponding to a beginning block and ending block of the source data within the logical volume copied from the source regions to the target regions such that only the sequence of bytes comprising the partition of the specific length are copied;

computer readable program code arranged to reconfigure the logical volume so that the target regions have the mapping between the host computer and the source storage system, such that input/output (I/O) requests are proxied through the source storage system to the target storage system;

computer readable program code arranged to receive a request to store an update to the one of the source regions, to store the update to the one of the source regions, and to store the update to the proxied corresponding target region; and computer readable program code arranged to receive a request to store an update to the one of the source regions, to store the update to the one of the source regions, and to store the update to the corresponding target region, and deleting the source data from the source storage system while maintaining the mapping between the host computer and the source storage system, wherein attributes comprise a serial number and a read-only status, and wherein the run-time information comprises a reservation and login information.

9. The computer program product according to claim 8, wherein the host computer, the source storage system and the target storage system are configured on a storage area network (SAN).

10. The computer program product according to claim 9, wherein the mapping between the host computer and the source storage system comprises a first mapping, and comprising computer readable program code arranged upon reconfiguring the logical volume, to add, for the logical volume, a second mapping between the host computer and the target storage system, and to delete the first mapping.

11. The computer program product according to claim 8, wherein the host computer and the source storage system are configured on a first storage area network (SAN) and the source storage system and the target storage system are configured on a second SAN.

* * * * *